(12) United States Patent
Guering (10) Patent No.: US 8,814,266 B2
(45) Date of Patent: Aug. 26, 2014

(54) HEADREST FOR A PASSENGER SEAT FOR AN AIRCRAFT

(75) Inventor: Bernard Guering, Montrabe (FR)

(73) Assignee: Airbus Operations (FR)

( * ) Notice: Subject to any disclaimer, the term of this patent is extended or adjusted under 35 U.S.C. 154(b) by 54 days.

(21) Appl. No.: 13/575,356

(22) PCT Filed: Jan. 28, 2011

(86) PCT No.: PCT/FR2011/050169
§ 371 (c)(1),
(2), (4) Date: Jul. 26, 2012

(87) PCT Pub. No.: WO2011/092435
PCT Pub. Date: Aug. 4, 2011

(65) Prior Publication Data
US 2012/0292960 A1    Nov. 22, 2012

(30) Foreign Application Priority Data
Jan. 29, 2010  (FR) ...................................... 10 50636

(51) Int. Cl.
*B60N 2/42*      (2006.01)
*B60N 2/427*     (2006.01)
*B60R 21/055*    (2006.01)
*B64D 11/06*     (2006.01)

(52) U.S. Cl.
CPC ........ *B64D 11/06* (2013.01); *B64D 2011/0651* (2013.01); *B64D 2011/0665* (2013.01); *B64D 2011/061* (2013.01)
USPC ...................................... 297/216.12; 297/487

(58) Field of Classification Search
USPC ............................................ 297/216.12, 487
See application file for complete search history.

(56) References Cited

U.S. PATENT DOCUMENTS

| | | | | |
|---|---|---|---|---|
| 2,638,293 | A * | 5/1953 | Lindstrom | 244/122 AE |
| 2,798,221 | A * | 7/1957 | Bailey et al. | 2/6.5 |
| 3,030,627 | A * | 4/1962 | Gibson et al. | 2/422 |
| 3,162,862 | A * | 12/1964 | Miller | 2/424 |
| 3,170,659 | A * | 2/1965 | Wood, Jr. | 244/122 B |
| 3,239,843 | A * | 3/1966 | Lobelle | 2/6.4 |
| 3,315,272 | A * | 4/1967 | Olt et al. | 2/424 |
| 3,329,464 | A * | 7/1967 | Barwood et al. | 297/465 |
| 3,380,073 | A * | 4/1968 | McLaughlin | 2/8.1 |
| 3,543,308 | A * | 12/1970 | Stapenhill | 2/6.4 |
| 3,748,657 | A * | 7/1973 | Aileo | 2/6.4 |
| 3,873,996 | A * | 4/1975 | Varteressian | 2/421 |
| 3,922,034 | A * | 11/1975 | Eggert | 297/216.12 |
| 4,100,619 | A * | 7/1978 | Piech et al. | 2/10 |
| 4,114,948 | A |  9/1978 | Perkey | |
| 4,170,792 | A * | 10/1979 | Higgs | 2/10 |

(Continued)

FOREIGN PATENT DOCUMENTS

| | | |
|---|---|---|
| DE | 19516012 C1 | 7/1996 |
| DE | 102007050139 A1 | 4/2009 |

(Continued)

*Primary Examiner* — Rodney B White
(74) *Attorney, Agent, or Firm* — Lerner, David, Littenberg, Krumholz & Mentlik, LLP (57) ABSTRACT

The aircraft passenger seat headrest (20) includes a carrier (21) and a helmet (22) for at least partially housing the head of the passenger.
The helmet is attached to the carrier and is movably mounted in relation to the carrier (21).
Said helmet includes a body and at least one portion (32, 34) that is movably mounted onto the body to extend the latter.

17 Claims, 4 Drawing Sheets

(56) References Cited

U.S. PATENT DOCUMENTS

| | | | |
|---|---|---|---|
| 4,231,117 A * | 11/1980 | Aileo | 2/420 |
| 4,440,443 A | 4/1984 | Nordskog | |
| 4,477,041 A * | 10/1984 | Dunne | 244/122 AG |
| 4,638,510 A * | 1/1987 | Hubbard | 2/6.1 |
| 4,664,341 A * | 5/1987 | Cummings | 244/122 AG |
| 4,784,352 A * | 11/1988 | Smith et al. | 244/122 AG |
| 4,909,459 A * | 3/1990 | Patterson | 244/122 AG |
| 4,923,147 A * | 5/1990 | Adams et al. | 244/122 AG |
| 5,003,631 A * | 4/1991 | Richardson | 2/6.1 |
| 5,272,422 A * | 12/1993 | Beaussant | 318/3 |
| 5,272,770 A * | 12/1993 | Allen et al. | 2/421 |
| 5,322,245 A * | 6/1994 | Bassick | 244/122 B |
| 5,329,642 A * | 7/1994 | Dampney | 2/424 |
| 5,467,480 A * | 11/1995 | Baudou et al. | 2/6.5 |
| 5,475,878 A * | 12/1995 | Dawn et al. | 2/411 |
| 5,477,850 A * | 12/1995 | Zegler et al. | 128/202.11 |
| 5,547,149 A | 8/1996 | Kalberer et al. | |
| 5,937,446 A * | 8/1999 | Fallert | 2/412 |
| 6,009,566 A * | 1/2000 | Hubbard | 2/468 |
| 6,094,750 A * | 8/2000 | Lee | 2/412 |
| 6,263,514 B1 * | 7/2001 | Chern | 2/410 |
| 6,352,383 B1 * | 3/2002 | Ristola | 403/254 |
| 6,363,540 B1 * | 4/2002 | Myers | 2/421 |
| 6,438,763 B2 * | 8/2002 | Guay et al. | 2/424 |
| 6,619,751 B1 * | 9/2003 | Shah | 297/464 |
| 6,709,062 B2 * | 3/2004 | Shah | 297/464 |
| 6,729,643 B1 * | 5/2004 | Bassick et al. | 280/730.1 |
| 6,751,809 B1 * | 6/2004 | Cooper et al. | 2/421 |
| 6,810,535 B1 * | 11/2004 | Moloney | 2/411 |
| 6,931,669 B2 * | 8/2005 | Ashline | 2/422 |
| 6,968,576 B2 * | 11/2005 | McNeil et al. | 2/425 |
| 7,120,982 B2 * | 10/2006 | Downing et al. | 29/401.1 |
| 7,404,402 B2 * | 7/2008 | Yu | 128/857 |
| 7,426,773 B2 * | 9/2008 | Downing et al. | 24/628 |
| 7,430,767 B2 * | 10/2008 | Nagely | 2/425 |
| 7,765,623 B2 * | 8/2010 | Ashline | 2/421 |
| 7,941,873 B2 * | 5/2011 | Nagely et al. | 2/425 |
| 8,181,281 B2 * | 5/2012 | Nagely et al. | 2/425 |
| 8,272,074 B1 * | 9/2012 | Ashline | 2/421 |
| 8,342,606 B2 | 1/2013 | Le Texier et al. | |
| 8,561,217 B2 * | 10/2013 | Nagely et al. | 2/425 |
| 2001/0002087 A1 * | 5/2001 | Townsend | 280/801.1 |
| 2002/0043831 A1 * | 4/2002 | Alsup | 297/216.12 |
| 2003/0088906 A1 * | 5/2003 | Baker | 2/416 |
| 2004/0025230 A1 * | 2/2004 | Rainey | 2/422 |
| 2004/0121141 A1 * | 6/2004 | Monaci | 428/315.5 |
| 2004/0255368 A1 * | 12/2004 | Baker | 2/410 |
| 2012/0000011 A1 * | 1/2012 | Grewall | 2/421 |

FOREIGN PATENT DOCUMENTS

| | | |
|---|---|---|
| FR | 2696388 A1 | 4/1994 |
| FR | 2917344 A1 | 12/2008 |
| WO | 9609205 A1 | 3/1996 |

\* cited by examiner

HEADREST FOR A PASSENGER SEAT FOR AN AIRCRAFT

CROSS-REFERENCE TO RELATED APPLICATIONS

The present application is a national phase entry under 35 U.S.C. §371 of International Application No. PCT/FR2011/050169, filed Jan. 28, 2011, published in French, which claims priority from French Patent Application No. 1050636 filed Jan. 29, 2010, the entire disclosures of which are hereby incorporated herein by reference.

The invention concerns passenger seats for aircraft.

During aircraft flights, certain passengers have periods when they are bored either during a wait phase preceding take-off or following landing or during a cruise phase. Moreover, it is known that aircraft flights generate stress for certain passengers.

To solve this problem, activities are currently proposed onboard the aircraft. Thus, music is broadcast or films shown, access is given to video games or, again, catering services are ensured.

However, these various occupations are in some cases insufficient to relieve boredom or stress.

An aim of the invention is to improve in this respect the comfort of aircraft passengers.

For this purpose, an aircraft passenger seat headrest is provided according to the invention which includes a carrier and a helmet for at least partially housing the head of the passenger, the helmet being attached to the carrier.

Thus, the helmet in which the passenger houses his/her head offers him/her sensorial isolation with regard to the external environment. This isolation can be more or less pronounced according to the configuration of the helmet and the functionalities which are associated with it. This isolation allows the passenger to better profit from some of the distractions offered, for example listening to music, watching films, etc. If the passenger is sensitive to stress, this isolation, possibly associated with one of the above-mentioned activities, allows him/her to more easily calm down and relax. In all cases, the invention improves therefore the comfort of the passengers and the pleasantness of their flight.

According to the embodiments, the isolation can be a sound, visual and/or olfactory isolation. It can be total or partial for any of these aspects, or several of them or all.

It is advantageously provided that the helmet has a form such that it closely adapts to the head of the passenger.

Preferentially, the carrier forms a rear rest for the head.

Thus, the headrest function is fulfilled independently of the helmet.

Preferentially, the helmet is movably mounted in relation to the carrier.

Thus, the passenger can place the helmet on or around his/her head without having to move the latter or move a part of his/her bust. The passenger can therefore easily install the helmet then remove it.

In an embodiment, the helmet is movably mounted between a forward position and a backward position and/or between an high position and a low position.

The helmet can be provided with means for adjusting a stable position of the helmet.

The passenger occupying the seat can therefore adapt the position of the helmet particularly according to his/her own morphology.

Preferentially, the helmet includes a body and at least a portion movably mounted on the body to extend the latter.

Thus, whilst allowing easy installation of the helmet, the passenger is offered pronounced isolation due to the fact that his/her head is covered more by the helmet.

In an embodiment, the movable portion or at least one of the movable portions is opaque.

In another embodiment, compatible with the previous one, the movable portion or at least one of the movable portions is transparent.

Particularly, the transparent movable portion can be installed directly on the opaque movable portion.

The transparent movable portion typically forms a visor which enables the passenger at the same time to be better isolated from an acoustic point of view and to continue to see a large portion of his/her environment.

The headrest can include means to modify the degree of transparency of the movable portion.

Preferentially, the headrest includes an opto-electronic screen formed by a portion, preferably movable, of the helmet.

The movable portion itself can carry a movable element allowing it to be obscured in full or in part to change at will from an opaque state to a transparent state and vice versa.

The body, the movable portion or, again, one of the movable portions has, for example, a concave form, particularly curved in at least one direction, the centre of the curvature being at one side of the helmet forming a housing accommodating the head of the passenger. This form can be that of the complete helmet. The form can be concave in two directions perpendicular to each other, for example to give the helmet a general spherical form or a general ellipsoid form.

Preferentially, the headrest includes earphones movably mounted in relation to the carrier and to the helmet.

These earphones allow the passenger to listen to music or a film with good auditory quality whilst choosing their position for better comfort. The passenger can move them away from his/her head particularly when s/he no longer requires them without being hindered therefore by them. As the earphones are movable in relation to the carrier and to the helmet, their use and their configuration are independent from those of the helmet. They can be used therefore whether the passenger is wearing the helmet or not.

Preferentially, the headrest includes means for diffusing images.

The passenger can follow therefore a television broadcast, watch a film or play a video game, for example, in a comfortable manner.

In an embodiment, the headrest includes glasses for diffusing images movably mounted in relation to the carrier and to the helmet.

These glasses offer the passenger good visual comfort. Knowing that they are movable in relation to the carrier and to the helmet, the passenger can use them whether s/he is wearing the helmet or not.

Preferentially, the headrest includes means for diffusing an image of a keyboard and to cooperate with the image to enter instructions and/or data from the keyboard and to transmit them to the helmet.

The headrest can include a microphone.

Advantageously, the headrest includes means for receiving and processing at least a signal of the following types:
 video,
 video for the supply of a three-dimensional image,
 holographic video or
 TCP/IP.

Preferentially, the headrest includes means for connection to an air flow source, the headrest being capable of circulating the flow along an inner face of the helmet.

Air circulation is achieved therefore between the helmet and the head of the passenger ensuring a ventilation, a refreshment or again an air conditioning and improving the comfort of the passenger when s/he is wearing the helmet.

Preferentially, the headrest includes means for diffusing at least an odorous substance.

Advantageously, the headrest includes a remote control.

The latter allows the passenger to control one or the other of the functions associated with the helmet or, again, the movements of the latter if drive means are provided for this purpose.

Preferentially, the headrest includes means for movably mounting the headrest on a passenger seat.

Thus, the passenger wearing the helmet remains free to make certain movements, particularly with his/her head, for example movements from forwards to backwards, movements from left to right or, again, twisting movements around a vertical or horizontal axis.

Advantageously, the mounting means are elastically deformable.

Thus, mobility is ensured by the simple elastic deformation of these means.

The headrest can include means for removably mounting it on an aircraft passenger seat.

Thus, the headrest can be rapidly installed on a seat for example replacing the standard headrest not including the helmet. This installation can be done for all the seats of a passenger compartment of an aircraft or, again, on some of them only, on specific request from the corresponding passengers. It can be for example a paid option.

According to the invention, an aircraft passenger seat is also provided which includes a headrest according to the invention.

In an embodiment, the helmet is larger in width in transverse direction, lower than or equal to the width at the top of the backrest. These dimensions are measured along a horizontal direction, perpendicular to the vertical symmetry plane of the seat.

Thus, the helmet adapts closely to the head of the passenger and takes up little space in the passenger compartment.

Advantageously, the seat includes an inflatable cushion protective device (or "airbag"), the cushion being capable of extending at the rear part of the headrest.

This cushion offers a protection for the passenger located behind the seat equipped with the headrest in case of sudden deceleration forwards.

Also, according to the invention, an aircraft passenger seat is provided which includes a backrest and a helmet for at least partially housing the head, attached to the backrest.

Again, according to the invention, an aircraft is provided which includes at least a headrest and/or a seat in compliance with the invention.

Lastly, according to the invention, an assembly of a headrest according to the invention and several decorative elements each capable of being placed on the helmet to modify the appearance is provided.

The headrest can thus be modified and customized at will.

The features and advantages of the invention will become apparent on reading the following description of a preferred embodiment and variants given as non-exhaustive examples making reference to the appended drawing on which.

Figure 1:
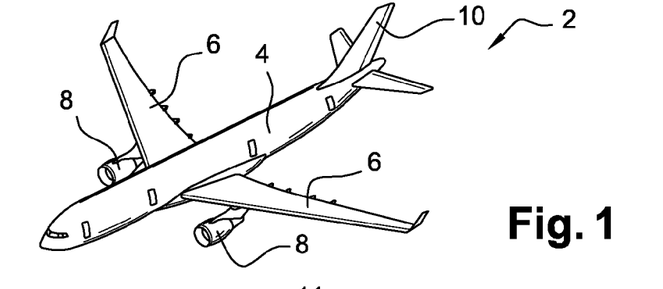
FIG. 1 is a perspective view of an aircraft according to the invention.

FIG. 1 shows an aircraft according to the invention which is in this case an aerodyne and in the present example an aircraft 2. The latter includes a fuselage 4, two wings 6 and engines 8, in this case two, and carried by the respective wings. The aircraft includes a tailplane 10. It is a passenger civil transport aircraft.

Figure 2:
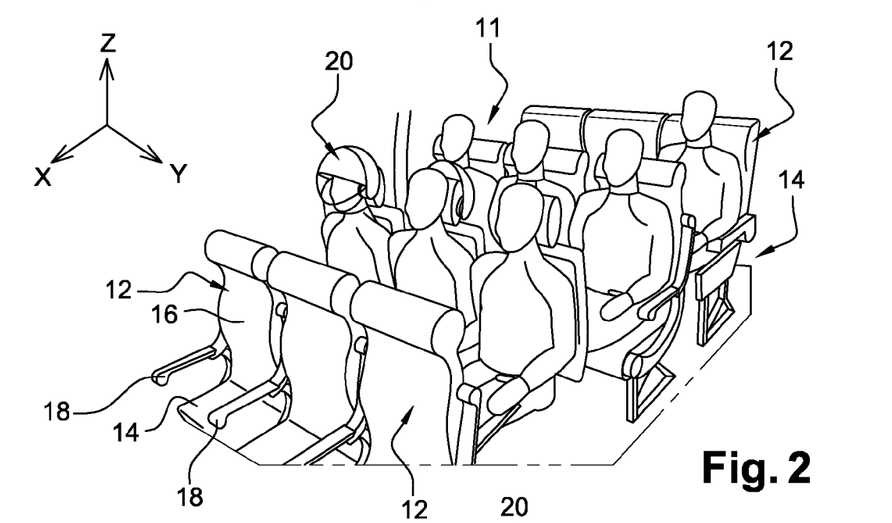
FIGS. 2 to 4 are partial views of the inside of the passenger compartment of the aircraft of FIG. 1 showing seats equipped with headrests according to the invention.

Below, the X, Y and Z axis system shown on FIG. 2 is used where the horizontal directions X and Y designate respectively the longitudinal direction of the fuselage and the direction perpendicular to the latter whereas direction Z is the vertical direction.

Figure 3:
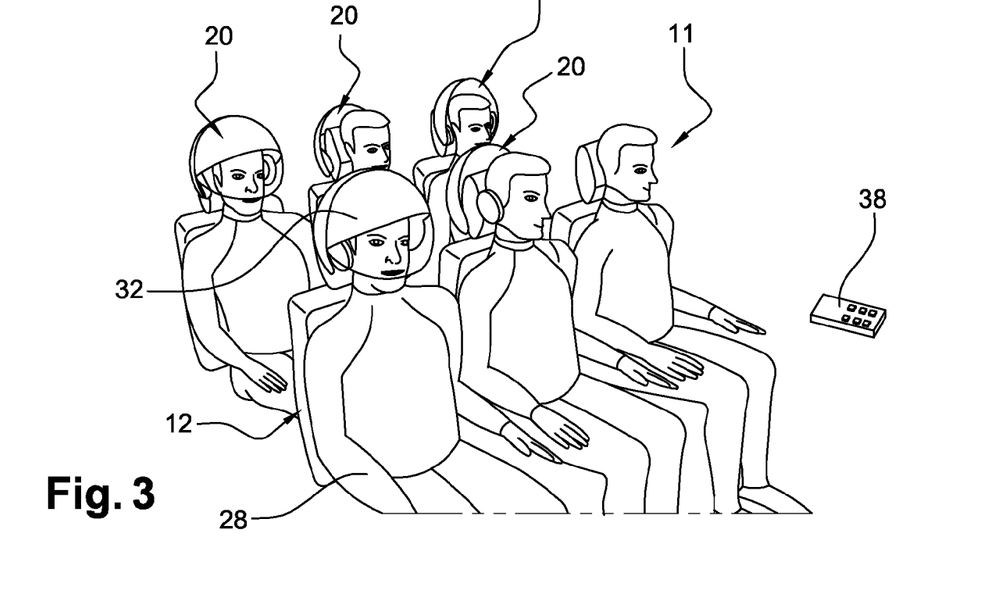
Figure 4:
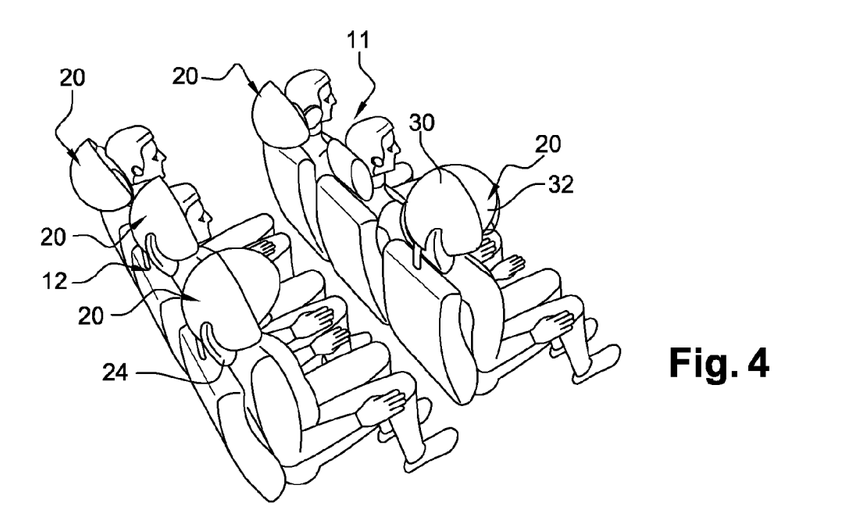

The passenger compartment 11 of the aircraft shown on FIGS. 2 to 4 includes several passenger seats 12 aligned in direction Y to form successive rows in direction X. From one row to another, the seats are also aligned in this same direction. Here, the passenger compartment includes an aisle 14 extending in the center part of the fuselage, the seats being located on either side of the aisle. The aisle is in this case unique. In this example, each row includes three seats on each side of the aisle. Each seat 12 forms in this case a seat including a seat pan 14, a backrest 16 and two armrests 18, the armrests of adjacent seats being common to the two seats.

Some of the seats 12 are equipped with a headrest 20 according to the invention visible particularly on FIGS. 2 to 16. The headrest includes a carrier 21 and a helmet 22 attached to the carrier and movably mounted in relation to the latter.

The carrier 21 includes a cushion 24 forming a rear rest for the head 26 of a passenger 28 occupying the seat.

The helmet 22 includes in this case a main opaque shell 30, a secondary opaque shell 32 and a secondary transparent shell 34 forming a visor, here all three being rigid.

Figure 8:
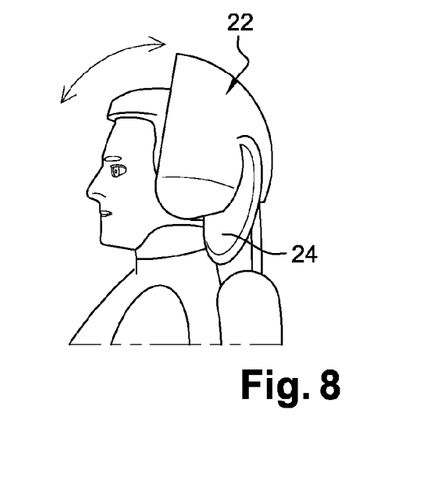
Figure 9:
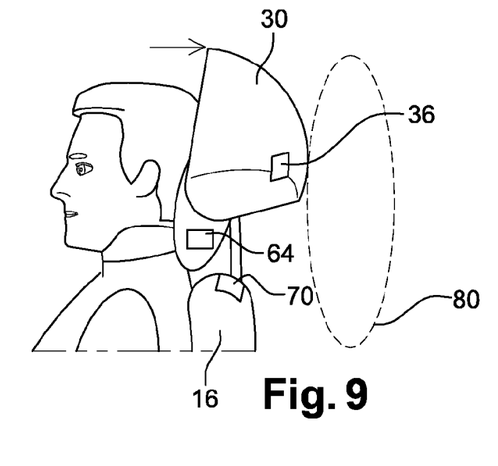
Figure 10:
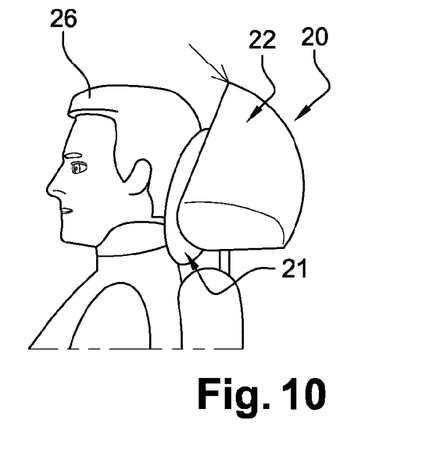

The main shell 30 is movably mounted in relation to the carrier 21, in this case along vertical direction Z between a low stable position shown particularly on FIG. 10 and a high stable position shown particularly on FIG. 9. These two positions form here the ends of the vertical travel of the shell 30 in relation to the carrier 21. Also, the shell 30 is movably mounted in relation to the carrier along horizontal direction X between a backward stable position shown on FIG. 9 and corresponding to the high position and a forward stable position shown particularly on FIG. 8 and located at the same height as the backward position. These two positions form here the ends of the horizontal travel of the shell 30 in relation to the carrier 21. The mounting means of shell 30 on the carrier 21 are provided in this case so that, from the forward position, the shell 30 must first pass via the backward position before being placed in low position and vice versa. In this example, knowing that the orientation of the shell does not change during these movements, we are concerned here with a translation movement of the shell 30 in relation to the carrier 21.

The secondary shell 32 is movably mounted in relation to the main shell 30, in this case by mounting means rotating around an axis parallel to direction Y. The shell 32 can therefore in this case pass from a rear retracted position, shown for example on FIG. 8, where it extends inside the shell 30 without appearing outside it to a forward down position shown for example on FIG. 7, where it emerges from the shell 30 at the front of the latter. The shell 32 is movably mounted directly on the shell 30, in this case.

The shell 34 is likewise movably mounted to rotate in relation to the shell 32 and can take up a fully retracted position inside the latter, shown for example on FIG. 7, where it is invisible from outside of the helmet, and a visible position shown for example on FIGS. 5 and 6 where it extends forwards and below the secondary shell 32. The visor 34 is movably mounted directly on the shell 32, in this case.

The three shells have hollow concave forms, in this case substantially portions of a sphere. They are arranged concentrically. When the three shells are visible as shown particularly on FIGS. 5 and 6, they extend all three substantially in the extension of each other forming the major part of a sphere. Each of the three shells has a concavity, in this case a curvature, in two planes perpendicular to each other. However, it could be provided that the radii of curvature are not the same in the two directions for at least one of the shells.

Figure 15:
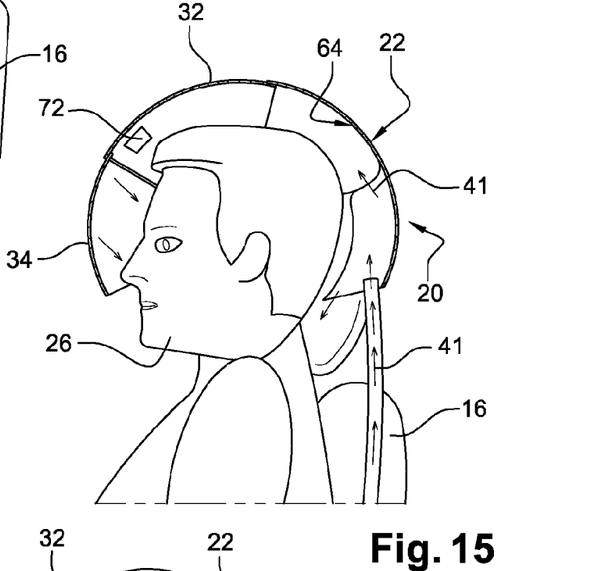
FIG. 15 is a view similar to FIG. 7 showing a vertical cross-sectional view through the helmet with the air circulation flow and, FIG. 16 is a perspective view from the rear showing the degrees of freedom of movement of the headrest of FIG. 5 in relation to the backrest.

A certain difference between the radii of curvature is however provided to allow the transparent shell to enter into the shell 32 and the latter to enter into the shell 30 as shown on FIG. 15. The outer face of the visor 34 is in contact with the inner face of the secondary shell 32, the upper rear edge of the first one penetrating under the forward lower edge of the second one. The secondary shell 32 is in a configuration similar to the main shell 30, As can be seen particularly on FIG. 9, the rest 21 extends beyond the backrest 16 in the extension of the latter and upwards.

In low position, the shell 30 extends in this case at the rear of the carrier 21 without extending forwards of the latter. It is also located integrally above the backrest 16. Its upper portion protrudes beyond the rest 21. As shown particularly on FIG. 9, the shell 30, in high position, extends further beyond rest 21 at upper portion.

The headrest is configured so that, in upper and lower positions, the shell 30 extends over more than 80% of its length at the rear of the head 26 of the passenger resting on rest 21. Particularly, the shell 30 does not then extend with regard to the upper face and the lateral faces of the head. It particularly leaves the top of the head and the ears of the passenger free.

As shown on FIG. 8, in forward position, the shell 30 extends beyond rest 21 at the front of the latter in direction X and above the latter in direction Y. The shell 30 partially covers the upper and lateral faces of the head 26 covering the top of the head and the ears. The complete rear portion of the head is then housed in the helmet 22.

Figure 7:
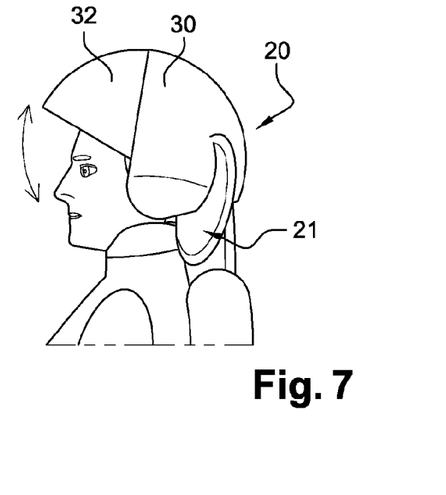

In reference to FIG. 7, when the shell 30 is in the same position with the secondary shell 32 deployed, the latter extends forwards from the shell 30 so that the helmet covers the complete upper face of the head and the major portion of its lateral faces. Only the lower part of the head emerges from the helmet. The front edge of the shell 32 extends further than the head along direction X. The lower front edge of the shell 32 is directed forwards and extends in this case in a plane forming an angle of around 30° with a horizontal plane.

Figures 5, 6:
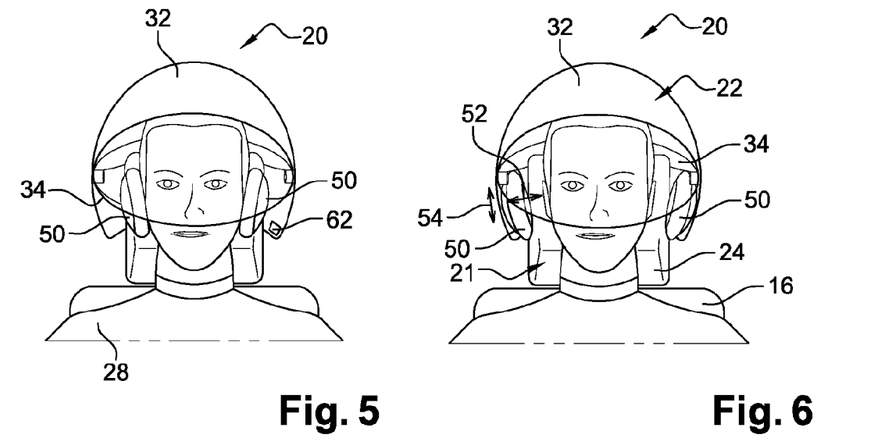
FIGS. 5 to 12 are views showing various configurations of one of the headrests of FIG. 2.

Lastly, in reference to FIGS. 5 and 6, when, from the same position of shells 30 and 32, the shell 34 is also deployed and lowered, it also covers the upper portion of the face at the front so that the larger portion of the head 26 is housed and isolated in the helmet 30. The transparent visor extends opposite the nose, the eyes and the brow of the passenger allowing him/her to continue to observe his/her environment.

Figure 11:
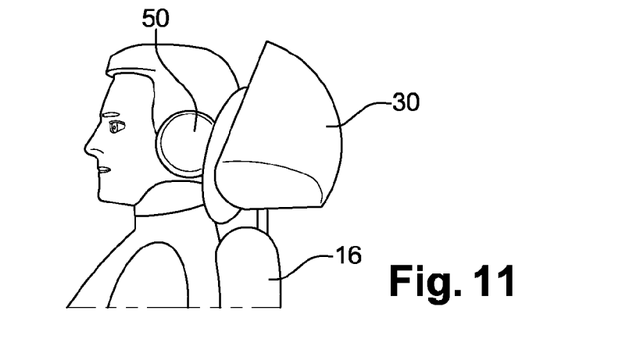

It is provided, for example, that the helmet is in folded back and low position as on FIG. 11 when the passenger seats down in his/her seat. When s/he wishes to put on the helmet, the passenger causes the helmet to rise from the low position to the high position, then forwards from backward position to forward position shown on FIG. 8. S/he can then also deploy the opaque visor 32 and, if s/he so wishes, also the transparent visor 34. When the passenger no longer wishes to wear the helmet, s/he does the opposite maneuvers.

The headrest can include means allowing the passenger to adjust the low position or the high position or again the forward position of the helmet to adapt it to his/her own morphology.

In this case, the seat is equipped with drive means 36 shown on FIG. 9 and ensuring, on request, the movement of the helmet and the various movements of the above-mentioned shell. Each seat is in this case equipped with a remote control 38 shown on FIG. 3 and allowing the passenger to control the drive means to obtain these various movements and each of the functions described below. The headrest is also provided so that, in spite of these drive means, the passenger retains the possibility of making these movements him/herself by maneuvering the various portions of the shell by hand. This is for example a use in degraded mode.

As can be seen particularly on FIGS. 5 and 6, when all the shells are in position and deployed, the helmet offers the passenger maximum isolation enabling him/her, at least to a certain extent, to become isolated from his/her environment and better live the wait and the flight.

Figure 12:
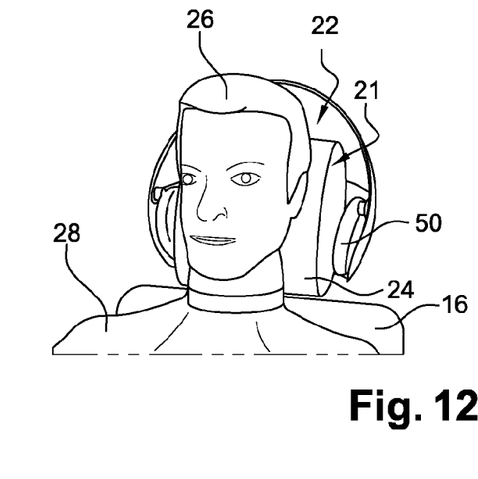
Figure 13:
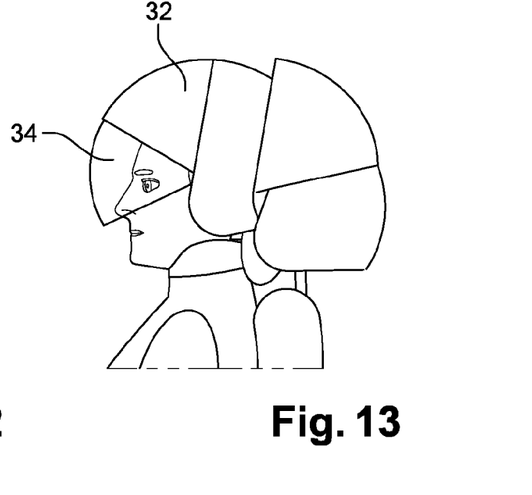
FIG. 13 is a view similar to FIG. 7 showing the sum of these configurations.

When, as shown particularly on FIG. 12, the helmet is in its low and completely folded back position, the head is completely outside of the helmet, the cushion 24 of the headrest is used by the passenger to rest his/her head. The passenger conserves this rest by maneuvering the helmet and whilst s/he is wearing it.

The means for mounting the helmet on the rest and for mounting the various portions of the helmet to each other are formed by adapted mechanisms which can be made in different ways by means of movable parts and conventional mechanical links to allow the movements and the functionalities presented here.

Figure 16:
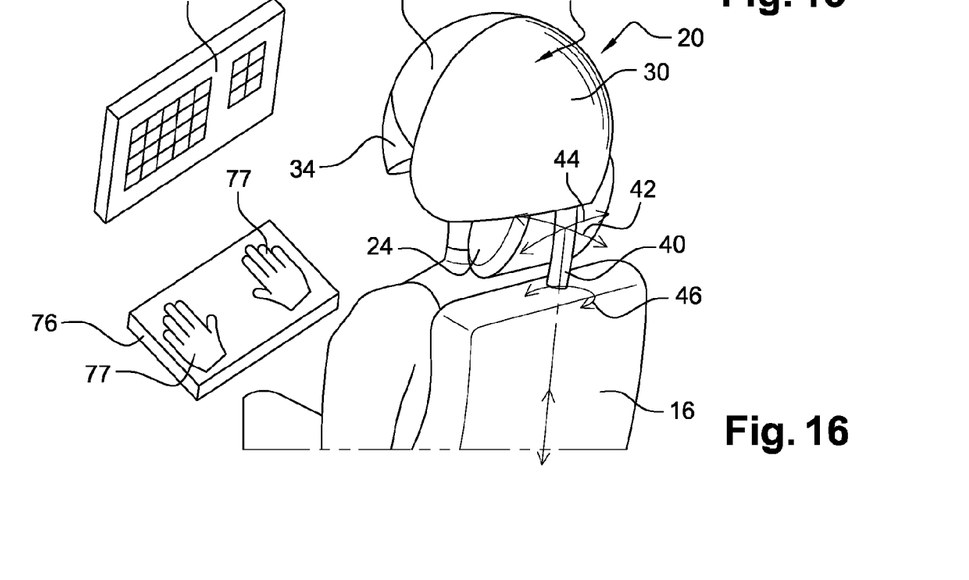

In reference to FIG. 16, the headrest includes in this case a connecting element 40 to the backrest 16 of the seat. This is a removable connecting element allowing therefore the headrest to be placed on the backrest and separated from it at will. It can be installed therefore on only certain seats of the passenger compartment, for example on request from the passenger, particularly within the scope of a paid option. However, naturally, all the seats can be systematically equipped with such a headrest.

Also, it is a movable connecting element ensuring a movable mounting of the headrest in relation to the backrest 16. Here, element 40 includes elastically flexible means allowing the passenger, by elastic deformation of the element, to move his/her head when it is housed in the helmet. These are, for example, forwards to rearwards twisting movements such as shown by arrow 42, left to right twisting movements such as shown by arrow 44 or, again, twisting movements around a vertical axis as shown by arrow 46. Element 40 is formed here by a single retaining tube and, therefore, offers a high freedom of movement to the passenger. It is also arranged to allow an adjustment in vertical direction of the high and low positions according to the morphology of the passenger.

The headrest includes in this case other equipment.

It thus includes left and right earphones 50 shown particularly on FIG. 6. Each of these earphones is movably mounted in relation to the carrier 21 and in relation to the helmet. They are movable in lateral direction Y and vertical direction Z so that they can at will be moved away from or moved towards the respective ears as shown by arrow 52 or, again, lowered or raised as shown by arrow 54. This possibility of movement allows the passenger to adjust the position of the earphones to suit his/her morphology when s/he wishes to apply them against his/her ears. It also allows the passenger to at will move the earphones towards his/her ears or to move them away, particularly when s/he does not wish to use them. The earphones 50 are connected to the other parts of the headrest by appropriate mechanical mounting means not shown. On FIG. 5, the earphones 50 are in a position ensuring high-quality listening as they are in contact with the lateral faces of the head and cover the ears of the passenger. They are at a distance from the head on FIG. 6 and are found in stored position, position where they also allow reception of ambient type. The earphones have also a spherical mobility allowing them to be adjusted angularly against the faces of the head. The earphones 50 cover the major part of the ear. They offer many adjustments allowing the passenger to choose the types of ambiance or immersion from which s/he wishes to benefit. The headrest is provided here to diffuse on request in the earphones 50 a "white noise" allowing the noises of the environment to be reduced or exactly cancelled out to better isolate the passenger from the ambient noise.

The headrest includes in this case image diffusion means. They are, for example, a pair of image diffusion glasses 60 movably mounted, by appropriate means not shown, in relation to the carrier 21 and in relation to the helmet. The glasses 60 can thus have an operational configuration where they are worn by the passenger and are opposite his/her eyes and rest on his/her nose. They can also have an inactive configuration where they are raised above or behind his/her head inside the helmet. In this case, the glasses are free to rotate in relation to the carrier around an axis parallel to direction Y. The glasses form a display screen. They operate in this case according to the so-called holographic projection mode. It can however be provided that as a variant the glasses are associated with two independent monitors placed independently over each eye. As a variant, the image diffusion means can be provided to ensure a projection of the image on the inner face of the visor 34.

The headrest also includes, as shown on FIG. 9, means 64 for the reception and processing of various types of electronic communication signals such as a video signal for the transmission of a three-dimensional image, a video signal for a holographic image or, again, a signal associated with a TCP/IP type protocol for exchanges on a communication network of Internet type in order to, particularly, diffuse the image by the above-mentioned means. It also includes electrical current supply means.

In this case, as shown on FIG. 5, the headrest is also equipped with a microphone 62 housed, for example, at a lower front edge of the main shell 30.

The headrest according to the invention offers therefore many entertainment and multimedia recreation possibilities. It thus allows the passenger to follow a high-definition video, for example by holographic type projection onto the inner face of the visor or, again, by the use of glasses 60. The earphones 50 are provided to be of high quality, the means 64 ensuring a high-fidelity processing of the audio signals received. The passenger can, thanks to all these possibilities, watch two- or three-dimensional image videos. The audio and video equipment of the headrest allows several types of programs to be diffused, particularly anti-stress programs (sophrology, etc.).

The headrest 20 is also equipped with audio and video connectors allowing the passenger to connect one or more personal electronic devices to the helmet (audio or video walkman, microcomputer, PDA, telephone, etc.) and to profit from the multimedia possibilities offered by the latter, particularly by reading his/her own contents.

The headrest is adapted here to allow the passenger to access an aircraft or airport camera network if the aircraft and the airport are equipped with these, thus offering the passenger an external view. The headrest is arranged to offer Internet access to the passenger and allow him/her to participate in video conferences or on-line discussions. It allows him/her to play video games.

The headrest is arranged to allow office work, especially in head up position. Here, for this purpose, a virtual keyboard 74 appearing in the image diffused by the helmet as shown on FIG. 16 is associated with the headrest. The seat can include a digitizing pad 76, for example attached to one of the armrests and connected to the helmet by an adapted link to communicate with the latter. The helmet is also associated with means for cooperating with the pad for entering instructions and/or data by the wearer of the helmet on the virtual keyboard 74, these instructions being transmitted to the helmet. These means include here motion capture gloves 77 that the passenger fits onto his/her hands and places on the pad to actuate on the image the keys of the virtual keyboard and enter commands, texts, etc. In each glove 77, each finger is equipped with sensors so that the positions of the fingers are known in relation to the pad and therefore in relation to the image of the keyboard. Inside the helmet, one or two virtual hands cooperating with the keyboard and representing those of the passenger are projected in addition to the keyboard onto the display screen. The objective is then for the passenger to identify himself/herself with this virtual me and use the virtual keyboard with his/her virtual fingers ignoring the real world. The keyboard which appears on the diffused image includes, for example, areas assigned to letters and numbers with an "azerty" or a "querty" type configuration. The words, numbers or instructions are then processed either in the helmet if it includes one or more IT processors for this purpose or transmitted to outside the helmet to IT means.

The remote control 38 can be made in virtual form it also being projected onto the screen and controlled in the same way from the gloves and the pad.

Alternatively, the real remote control 38 considered above is equipped with keys such as sensitive keys which, when they are actuated by the passenger, lead to the display of a remote control in the image diffused by the helmet and the specific display (with a different color or highlighted for example) of the key or keys actuated by the passenger. Thus, without looking at the real remote control whilst s/he actuates it, s/he visualizes on the image which key is actuated.

As shown on FIG. 15, element 40 is hollow and communicates, on the one hand, with an air source provided in the backrest 16 and, on the other hand, with an internal cavity of the helmet and extends between an inner face 64 of the helmet and the outer face of the passenger's head. Indeed, the helmet is positioned, configured and dimensioned so that, when it equips the head, it ensures a layer of air of a general spherical shape, several millimeters or several centimeters thick, between these two faces, layer which communicates with the element 40. If therefore an air flow 41 is sent from the backrest 16 through the element 40, it covers this complete layer ensuring a ventilation, a refreshing, or even air conditioning of the head of the passenger if the air is freshened or conditioned upstream. It can be provided that this ventilation is done not around the top of the skull, but only at the neck, for example in cooperation with the rest 21. The headrest here offers the passenger the possibility of choosing one or the other of the types of ambient flow, refreshed or conditioned. The distributed air can be enhanced with or more natural or synthetic odorous substances. This air can also be enhanced with oxygen in order, for example, to create a certain type of environment or procure a relaxation. The enhancement of the air with odorous substances or oxygen is done upstream, for example under seat pan of the seat. Alternatively, the helmet can include a device 72 shown on FIG. 14 and capable of diffusing in the air intended for the wearer of the helmet one or more odorous substances.

In this example, the visor 34 has an opto-electronic effect allowing the darkening to be controlled on request to make it less transparent, that is reduce the opacity, or make it completely opaque. It is, for example, equipped with an electrochrome material. The passenger can therefore, on request, reduce or eliminate the view of the environment from which s/he benefits and place himself/herself, for example in a penumbra, especially to benefit better from the images diffused by the headrest. The dimming control is ensured on request from the user via, for example, the remote control 38 placed at his/her disposal.

Figure 14:
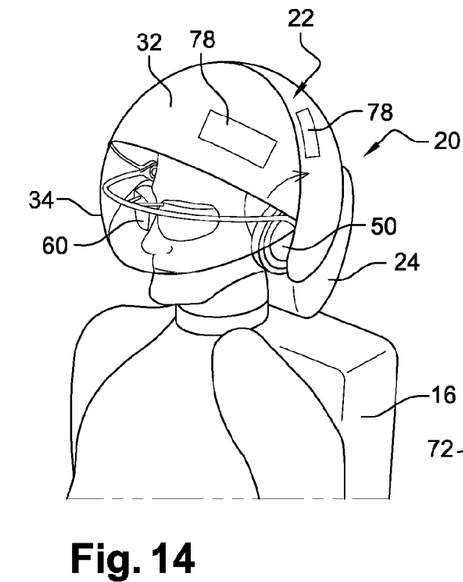
FIG. 14 is a view similar to FIG. 5 showing the passenger wearing the helmet and the glasses of the headrest.

As shown on FIG. 14, The helmet can on request be decorated in a customized manner, for example by means of a throwaway plastic film 78, applied and attached electrostatically to an outer face of the helmet. For example, a set of films 78 (or other elements) can be placed at the disposal of the passenger that s/he can at his/her discretion apply to the helmet to decorate it. The airline operating the aircraft also has the possibility of customizing the helmets.

As shown on FIG. 9, the headrest is equipped in this case with a device 70 with inflatable cushion 80 deploying at the supposed location of an impact with the head of the passenger occupying the seat located behind the seat considered in case of sudden deceleration. The cushion 80 in deployed state is shown by the dotted lines on FIG. 9. The inflation of the cushion 80, controlled by the detection of the deceleration by the latter, dampens the shock of the head of the passenger coming into contact with the cushion. In this case, the device 70 is provided on the upper rear face of the backrest 16.

FIGS. 2 to 4 show seats equipped with headrests, according to the invention, placed in the various configurations described above. On FIG. 5, the helmet is in deployed configuration, in so-called immersion position. It can be seen, on FIG. 11, that although the helmet is in stored rear low position, the passenger has the earphones 50 on his/her ears.

The headrest is equipped with means adapted so that the connection to the air circuit and the various electrical and electronic connections ensuring the supply of the headrest are ensured automatically on insertion of the headrest into the backrest.

Of course, many modifications can be made to the invention without falling outside its scope.

The rest 21 can be dispensed with and an aircraft passenger seat which includes a backrest and a helmet installed directly on the backrest can be considered, the latter forming the carrier for the helmet.

The number of shells forming the helmet can be increased or reduced. The transparent or translucent visor can be dispensed with.

One or more of the shells can be of wraparound type but not rigid. Thus the helmet can be made from fabric and support arches. Also, the helmet can be made by means of a fabric and an inflated framework.

The helmet can also have a semi-spherical shape and laterally integrate movable earphones and video glasses formed in two adjustable portions independent of each other. As a variant, a headrest of same type can be equipped with glasses such as the glasses 60 of FIG. 14.

The helmet can have a general partially spherical or semi-spherical shape, especially with umbrella configuration, and be connected to the carrier by being suspended by its apex to an arch or to a curved arm descending towards the carrier.

At least one of the shells can have a concave shape in only one direction, for example in a vertical symmetry plane of the seat or a horizontal plane. This case can apply to the complete helmet.

The invention claimed is:

1. A headrest of a passenger seat of an aircraft, the headrest comprising:
    a carrier; and
    a helmet for at least partially housing the head of a passenger, the helmet being attached to the carrier and movably mounted to the carrier so as to have at least first and second positions such that in the first position, the helmet is retracted onto the carrier so as to not interfere with the movement of a head of a passenger into or out of a volume occupied by the head when the passenger is sitting on the passenger seat, and in the second position, the helmet at least partially covers the volume occupied by the head of the passenger sitting on the passenger seat.

2. The headrest according to claim 1, wherein the carrier is configured as a rear rest for the head.

3. The headrest according to claim 1, wherein the helmet is movable between at least one of a forward position and a backward position and a high position and a low position.

4. The headrest according to claim 1, wherein the helmet comprises:
    a body; and
    at least a portion movably mounted on the body to extend the body, wherein the movable portion is at least one of opaque and transparent.

5. The head rest according to claim 4, wherein the at least a portion comprises a first portion and a second portion; and
    wherein the first portion is opaque and the second portion is transparent.

6. The headrest according to claim 1, further comprising earphones movably installed in relation to the carrier and to the helmet.

7. The headrest according to claim 1, further comprising an image diffusion means.

8. The headrest according to claim 1, further comprising an opto-electronic screen formed by a portion, of the helmet.

9. The headrest according to claim 1, further comprising means for diffusing an image of a keyboard, and means configured to cooperate with at least one of the image to enter instructions and data from the keyboard and to transmit the instructions and the data to the helmet.

10. The headrest according to claim 1, further comprising means for connection to an air flow source, wherein the headrest is configured for circulating the flow along an inner face of the helmet.

11. The headrest according to claim 1, further comprising means for diffusing at least an odorous substance.

12. The headrest according to claim 1, further comprising an elastically deformable means for movably mounting the headrest on a passenger seat.

13. An aircraft passenger seat comprising:
    a headrest, the headrest comprising:
    a carrier; and
    a helmet for at least partially housing the head of a passenger, the helmet being attached and movably mounted to the carrier so as to have at least first and second positions such that in the first position, the helmet is retracted onto the carrier so as to not interfere with the movement of a head of a passenger into or out of a volume occupied by the head when the passenger is sitting on the passenger seat, and in the second position, the helmet at least partially covers the volume occupied by the head of the passenger sitting on the passenger seat.

14. An assembly of a headrest, the headrest comprising:

a carrier; and a helmet for at least partially housing the head of a passenger, the helmet being attached to the carrier and movably mounted to the carrier so as to have at least first and second positions such that in the first position, the helmet is retracted onto the carrier so as to not interfere with the movement of a head of a passenger into or out of a volume occupied by the head when the passenger is sitting on the passenger seat, and in the second position, the helmet at least partially covers the volume occupied by the head of the passenger sitting on the passenger seat; and a plurality of decorative elements each configured for being placed on the helmet.

15. The seat according to claim 13 further comprising a protective device with inflatable cushion, the cushion being configured for extending at the rear portion of the headrest.

16. An aircraft passenger seat comprising:

a backrest for a head of a passenger seating in the passenger seat; and a helmet, for at least partially housing the head of a passenger, movably attached to the backrest so as to have at least first and second positions such that in the first position, the helmet is retracted onto the backrest so as to not interfere with the movement of a head of a passenger into or out of a volume occupied by the head when the passenger is sitting on the passenger seat, and in the second position, the helmet at least partially covers the volume occupied by the head of the passenger sitting on the passenger seat.

17. The seat according to claim 16, further comprising a protective device with inflatable cushion, the cushion being configured for extending at the rear portion of the headrest.

* * * * *